United States Patent
Wisniewski

(12) 
(10) Patent No.: US 6,460,059 B1
(45) Date of Patent: Oct. 1, 2002

(54) VISUAL AID TO SIMPLIFY ACHIEVING CORRECT CELL INTERRELATIONS IN SPREADSHEETS

(75) Inventor: Robert William Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,490

(22) Filed: Aug. 4, 1998

(51) Int. Cl.$^7$ .......................... G06F 17/00; G06F 17/24; G06F 15/00
(52) U.S. Cl. .................... 707/503; 707/504; 707/506
(58) Field of Search .............................. 707/503, 506, 707/4, 504; 345/326

(56) References Cited

U.S. PATENT DOCUMENTS

| | | | | |
|---|---|---|---|---|
| 5,317,686 A | * | 5/1994 | Salas et al. ................. | 707/503 |
| 5,603,021 A | * | 2/1997 | Spencer et al. .............. | 707/4 |
| 5,623,591 A | * | 4/1997 | Cseri ......................... | 345/326 |
| 5,694,608 A | * | 12/1997 | Shostak ...................... | 707/506 |
| 5,893,123 A | * | 4/1999 | Tuinenga ..................... | 707/504 |
| 6,157,934 A | * | 12/2000 | Khan et al. .................. | 707/503 |
| 6,185,582 B1 | * | 2/2001 | Zellweger et al. ........... | 707/503 |

OTHER PUBLICATIONS

Richardson, R., Professional's Guide to Robust Spreadsheets, Manning Publications Co., pp. 15, 20, 34–41, 108–110, 169–177, 185–187, 196, 239, 1996.*

Cox, Phillip T. et al., Using visual programming to extend the power of spreadsheet, ACM Proceedings of the workshop on Advanced visual interfaces, pp. 153–161, Jun. 1994.*

Myers, Brad A., Graphical techniques in a spreadsheet for specifying user interfaces, ACM Conference on Human Factors and Computing Systems, pp. 243–249, May 1991.*

Fuller, David A. et al., The design of an object–oriented collaborative spreadsheet with version control and history management, ACM Symposium on Applied Computing, pp. 416–423, Feb. 1993.*

* cited by examiner

*Primary Examiner*—Joseph H. Feild
*Assistant Examiner*—William L. Bashore
(74) *Attorney, Agent, or Firm*—Douglas W. Cameron; Anne Vachon Dougherty

(57) ABSTRACT

A method and apparatus for displaying a spreadsheet on a display device in a computer system to facilitate easy recognition of errors. More specifically, with this invention one cell is selected, and there is a visual indication of such selection. Further, there is also a visual indication of those cells having data that either affects or depends upon the data in the selected cell. There is also a different visual indication for each level of dependency relative to the selected cell. For example, selected cell A may be immediately dependent upon cells B and C, where cell B may in turn be dependent upon cells D, E and F. Cells B and C are at the first level of dependency while cells D, E and F are at the second level of dependency. Thus, cells B and C may have a different marking or shading than cells D, E and F. The number of dependency levels to be displayed can be chosen by the user. The number of paths of cells to be displayed from a selected cell to a leaf cell can also be chosen by the user. This invention also provides for the simultaneous display of formulas in all cells.

10 Claims, 17 Drawing Sheets

FORMULA  =d9−b6

| | a | b | c | d | e | f | g |
|---|---|---|---|---|---|---|---|
| 1 | | JUN | JUL | AUG | SEP | SUM | |
| 2 | PARTS | 10 | 12 | 14 | 15 | | |
| 3 | PRICE/PART | 20 | 21 | 22 | 22 | | |
| 4 | PART COST | 200 | 252 | 308 | 330 | 1090 | |
| 5 | OVERHEAD | 50 | 51 | 50 | 51 | 202 | |
| 6 | TOTAL COST | 250 | 303 | 358 | 381 | 1292 | |
| 7 | ITEMS SOLD | 6 | 10 | 15 | 18 | | |
| 8 | ITEM PRICE | 25 | 26 | 28 | 30 | | |
| 9 | SALES REV | 150 | 260 | 420 | 540 | 1370 | |
| 10 | NET | (100) | (43) | 170 | 159 | 186 | |
| 11 | CHECK | | | | | 78 | |
| 12 | DIVIDEND | | | | | 50 | |
| 13 | CARRY | | | | | 28 | |
| 14 | | | | | | | |

| | a | b | c | d | e | f | g |
|---|---|---|---|---|---|---|---|
| 1 | FORMULA | MONTH 1 | MONTH 2 | ALL MONTHS | | | |
| 2 | VALUE 1 | 24 | 11 | =b2+c2 | | | |
| 3 | VALUE 2 | 17 | 24 | 41 | | | |
| 4 | VALUE 3 | 19 | 23 | 42 | | | |
| 5 | SUM | 60 | 58 | 118 | | | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |
| 14 | | | | | | | |

FORMULA =b2+c2 (11)

FIG.1
PRIOR ART

FORMULA  =b2+c2

|   | a | b | c | d | e | f | g |
|---|---|---|---|---|---|---|---|
| 1 |   | MONTH 1 | MONTH 2 | ALL MONTHS |   |   |   |
| 2 | VALUE 1 | 24 | 11 | =b2+c2 |   |   |   |
| 3 | VALUE 2 | 17 | 24 | 41 |   |   |   |
| 4 | VALUE 3 | 19 | 23 | 42 |   |   |   |
| 5 | SUM | 60 | 58 | 118 |   |   |   |
| 6 |   |   |   |   |   |   |   |
| 7 |   |   |   |   |   |   |   |
| 8 |   |   |   |   |   |   |   |
| 9 |   |   |   |   |   |   |   |
| 10 |  |   |   |   |   |   |   |
| 11 |  |   |   |   |   |   |   |
| 12 |  |   |   |   |   |   |   |
| 13 |  |   |   |   |   |   |   |
| 14 |  |   |   |   |   |   |   |

FIG.2

|   | a | b | c | d | e | f | g |
|---|---|---|---|---|---|---|---|
| 1 |   | JUN | JUL | AUG | SEP | SUM |   |
| 2 | PARTS | 10 | 12 | 14 | 15 |   |   |
| 3 | PRICE/PART | 20 | 21 | 22 | 22 |   |   |
| 4 | PART COST | 200 | 252 | 308 | 330 | 1090 |   |
| 5 | OVERHEAD | 50 | 51 | 50 | 51 | 202 |   |
| 6 | TOTAL COST | 250 | 303 | 358 | 381 | 1292 |   |
| 7 | ITEMS SOLD | 6 | 10 | 15 | 18 |   |   |
| 8 | ITEM PRICE | 25 | 26 | 28 | 30 |   |   |
| 9 | SALES REV | 150 | 260 | 420 | 540 | 1370 |   |
| 10 | NET | (100) | (43) | 62 | 159 | 78 |   |
| 11 | CHECK |   |   |   |   | 78 |   |
| 12 | DIVIDEND |   |   |   |   | 50 |   |
| 13 | CARRY |   |   |   |   | 28 |   |
| 14 |   |   |   |   |   |   |   |

FIG.4

|   | a | b | c | d | e | f |
|---|---|---|---|---|---|---|
| 1 |   | JUN | JUL | AUG | SEP | SUM |
| 2 | PARTS | =10 | =12 | =14 | =15 |   |
| 3 | PRICE/PART | =20 | =21 | =22 | =22 |   |
| 4 | PART COST | =b2*b3 | =c2*c3 | =d2*d3 | =e2*e3 | =b4+c4+d4+e4 |
| 5 | OVERHEAD | =50 | =51 | =50 | =51 | =b5+c5+d5+e5 |
| 6 | TOTAL COST | =b4+b5 | =c4+c5 | =d4+d5 | =e4+e5 | =b6+c6+d6+e6 |
| 7 | ITEMS SOLD | =6 | =10 | =15 | =18 |   |
| 8 | ITEM PRICE | =25 | =26 | =28 | =30 |   |
| 9 | SALES REV | =b7*b8 | =c7*c8 | =d7*d8 | =e7*e8 | =b9+c9+d9+e9 |
| 10 | NET | =b9−b6 | =c9−c6 | =d9−d6 | =e9−e6 | =b10+c10+d10+e10 |
| 11 | CHECK |   |   |   |   | =f9−f6 |
| 12 | DIVIDEND |   |   |   |   | =50 |
| 13 | CARRY |   |   |   |   | =f10−f12 |
| 14 |   |   |   |   |   |   |

FIG.5

|   | a | b | c | d | e | f | g |
|---|---|---|---|---|---|---|---|
| 1 |   | JUN | JUL | AUG | SEP | SUM |   |
| 2 | PARTS | 10 | 12 | 14 | 15 |   |   |
| 3 | PRICE/PART | 20 | 21 | 22 | 22 |   |   |
| 4 | PART COST | 200 | 252 | 308 | 330 | 1090 |   |
| 5 | OVERHEAD | 50 | 51 | 50 | 51 | 202 |   |
| 6 | TOTAL COST | 250 | 303 | 358 | 381 | 1292 |   |
| 7 | ITEMS SOLD | 6 | 10 | 15 | 18 |   |   |
| 8 | ITEM PRICE | 25 | 26 | 28 | 30 |   |   |
| 9 | SALES REV | 150 | 260 | 420 | 540 | 1370 |   |
| 10 | NET | (100) | (43) | 170 | 159 | 186 |   |
| 11 | CHECK |   |   |   |   | 78 |   |
| 12 | DIVIDEND |   |   |   |   | 50 |   |
| 13 | CARRY |   |   |   |   | 28 |   |
| 14 |   |   |   |   |   |   |   |

FIG.6

FORMULA | =b9-b6

| | a | b | c | d | e | f | g |
|---|---|---|---|---|---|---|---|
| 1 | | JUN | JUL | AUG | SEP | SUM | |
| 2 | PARTS | 10 | 12 | 14 | 15 | | |
| 3 | PRICE/PART | 20 | 21 | 22 | 22 | | |
| 4 | PART COST | 200 | 252 | 308 | 330 | 1090 | |
| 5 | OVERHEAD | 50 | 51 | 50 | 51 | 202 | |
| 6 | TOTAL COST | 250 | 303 | 358 | 381 | 1292 | |
| 7 | ITEMS SOLD | 6 | 10 | 15 | 18 | | |
| 8 | ITEM PRICE | 25 | 26 | 28 | 30 | | |
| 9 | SALES REV | 150 | 260 | 420 | 540 | 1370 | |
| 10 | NET | (100) | (43) | 170 | 159 | 186 | |
| 11 | CHECK | | | | | 78 | |
| 12 | DIVIDEND | | | | | 50 | |
| 13 | CARRY | | | | | 28 | |
| 14 | | | | | | | |

FIG.7

| | a | b | c | d | e | f | g |
|---|---|---|---|---|---|---|---|
| 1 | FORMULA | | =c9-c6 | | | | |
| 2 | | JUN | JUL | AUG | SEP | SUM | |
| 3 | PARTS | 10 | 12 | 14 | 15 | | |
| 4 | PRICE/PART | 20 | 21 | 22 | 22 | | |
| 5 | PART COST | 200 | 252 | 308 | 330 | 1090 | |
| 6 | OVERHEAD | 50 | 51 | 50 | 51 | 202 | |
| 7 | TOTAL COST | 250 | 303 | 358 | 381 | 1292 | |
| 8 | ITEMS SOLD | 6 | 10 | 15 | 18 | | |
| 9 | ITEM PRICE | 25 | 26 | 28 | 30 | | |
| 10 | SALES REV | 150 | 260 | 420 | 540 | 1370 | |
| 11 | NET | (100) | (43) | 170 | 159 | 186 | |
| 12 | CHECK | | | | | 78 | |
| 13 | DIVIDEND | | | | | 50 | |
| 14 | CARRY | | | | | 28 | |

FIG. 8

FORMULA  =d9-b6

|   | a | b | c | d | e | f | g |
|---|---|---|---|---|---|---|---|
| 1 |   | JUN | JUL | AUG | SEP | SUM |   |
| 2 | PARTS | 10 | 12 | 14 | 15 |   |   |
| 3 | PRICE/PART | 20 | 21 | 22 | 22 |   |   |
| 4 | PART COST | 200 | 252 | 308 | 330 | 1090 |   |
| 5 | OVERHEAD | 50 | 51 | 50 | 51 | 202 |   |
| 6 | TOTAL COST | 250 | 303 | 358 | 381 | 1292 |   |
| 7 | ITEMS SOLD | 6 | 10 | 15 | 18 |   |   |
| 8 | ITEM PRICE | 25 | 26 | 28 | 30 |   |   |
| 9 | SALES REV | 150 | 260 | 420 | 540 | 1370 |   |
| 10 | NET | (100) | (43) | 170 | 159 | 186 |   |
| 11 | CHECK |   |   |   |   | 78 |   |
| 12 | DIVIDEND |   |   |   |   | 50 |   |
| 13 | CARRY |   |   |   |   | 28 |   |
| 14 |   |   |   |   |   |   |   |

FIG.9

FORMULA  =10

|   | a | b JUN | c JUL | d AUG | e SEP | f SUM | g |
|---|---|---|---|---|---|---|---|
| 1 |   |   |   |   |   |   |   |
| 2 | PARTS | 10 | 12 | 14 | 15 |   |   |
| 3 | PRICE/PART | 20 | 21 | 22 | 22 |   |   |
| 4 | PART COST | 200 | 252 | 308 | 330 | 1090 |   |
| 5 | OVERHEAD | 50 | 51 | 50 | 51 | 202 |   |
| 6 | TOTAL COST | 250 | 303 | 358 | 381 | 1292 |   |
| 7 | ITEMS SOLD | 6 | 10 | 15 | 18 |   |   |
| 8 | ITEM PRICE | 25 | 26 | 28 | 30 |   |   |
| 9 | SALES REV | 150 | 260 | 420 | 540 | 1370 |   |
| 10 | NET | (100) | (43) | 62 | 159 | 78 |   |
| 11 | CHECK |   |   |   |   | 78 |   |
| 12 | DIVIDEND |   |   |   |   | 50 |   |
| 13 | CARRY |   |   |   |   | 28 |   |
| 14 |   |   |   |   |   |   |   |

FIG.10

FORMULA =10

| | a | b | c | d | e | f | g |
|---|---|---|---|---|---|---|---|
| 1 | | JUN | JUL | AUG | SEP | SUM | |
| 2 | PARTS | 10 | 12 | 14 | 15 | | |
| 3 | PRICE/PART | 20 | 21 | 22 | 22 | | |
| 4 | PART COST | 200 | 252 | 308 | 330 | 1090 | |
| 5 | OVERHEAD | 50 | 51 | 50 | 51 | 202 | |
| 6 | TOTAL COST | 250 | 303 | 358 | 381 | 1292 | |
| 7 | ITEMS SOLD | 6 | 10 | 15 | 18 | | |
| 8 | ITEM PRICE | 25 | 26 | 28 | 30 | | |
| 9 | SALES REV | 150 | 260 | 420 | 540 | 1370 | |
| 10 | NET | (100) | (43) | 62 | 159 | 78 | |
| 11 | CHECK | | | | | 78 | |
| 12 | DIVIDEND | | | | | 50 | |
| 13 | CARRY | | | | | 28 | |
| 14 | | | | | | | |

FIG.11

| FORMULA | =b4+c4+d5+e4 |
|---|---|

| | a | b | c | d | e | f | g |
|---|---|---|---|---|---|---|---|
| 1 | | JUN | JUL | AUG | SEP | SUM | |
| 2 | PARTS | 10 | 12 | 14 | 15 | | |
| 3 | PRICE/PART | 20 | 21 | 22 | 22 | | |
| 4 | PART COST | 200 | 252 | 308 | 330 | 1090 | |
| 5 | OVERHEAD | 50 | 51 | 50 | 51 | 202 | |
| 6 | TOTAL COST | 250 | 303 | 358 | 381 | 1292 | |
| 7 | ITEMS SOLD | 6 | 10 | 15 | 18 | | |
| 8 | ITEM PRICE | 25 | 26 | 28 | 30 | | |
| 9 | SALES REV | 150 | 260 | 420 | 540 | 1370 | |
| 10 | NET | (100) | (43) | 62 | 159 | 78 | |
| 11 | CHECK | | | | | 78 | |
| 12 | DIVIDEND | | | | | 50 | |
| 13 | CARRY | | | | | 28 | |
| 14 | | | | | | | |

FIG.12

FORMULA  =b4+c4+d5+e4

| a | | b | c | d | e | f | g |
|---|---|---|---|---|---|---|---|
| | | JUN | JUL | AUG | SEP | SUM | |
| 2 | PARTS | 10 | 12 | 14 | 15 | | |
| 3 | PRICE/PART | 21 | 20 | 22 | 22 | | |
| 4 | PART COST | 200 | 252 | 308 | 330 | 1090 | |
| 5 | OVERHEAD | 50 | 51 | 50 | 51 | 202 | |
| 6 | TOTAL COST | 250 | 303 | 358 | 381 | 1292 | |
| 7 | ITEMS SOLD | 6 | 10 | 15 | 18 | | |
| 8 | ITEM PRICE | 25 | 26 | 28 | 30 | | |
| 9 | SALES REV | 150 | 260 | 420 | 540 | 1370 | |
| 10 | NET | (100) | (43) | 62 | 159 | 78 | |
| 11 | CHECK | | | | | 78 | |
| 12 | DIVIDEND | | | | | 50 | |
| 13 | CARRY | | | | | 28 | |
| 14 | | | | | | | |

FIG.13

| | a | b | c | d | e | f | g |
|---|---|---|---|---|---|---|---|
| | FORMULA | =b4+c4+d5+e4 | | | | | |
| 1 | | JUN | JUL | AUG | SEP | SUM | |
| 2 | PARTS | 10 | 12 | 14 | 15 | | |
| 3 | PRICE/PART | 20 | 21 | 22 | 22 | | |
| 4 | PART COST | 200 | 252 | 308 | 330 | 1090 | |
| 5 | OVERHEAD | 50 | 51 | 50 | 51 | 202 | |
| 6 | TOTAL COST | 250 | 303 | 358 | 381 | 1292 | |
| 7 | ITEMS SOLD | 6 | 10 | 15 | 18 | | |
| 8 | ITEM PRICE | 25 | 26 | 28 | 30 | | |
| 9 | SALES REV | 150 | 260 | 420 | 540 | 1370 | |
| 10 | NET | (100) | (43) | 62 | 159 | 78 | |
| 11 | CHECK | | | | | 78 | |
| 12 | DIVIDEND | | | | | 50 | |
| 13 | CARRY | | | | | 28 | |
| 14 | | | | | | | |

FIG.14

FORMULA: =b4+c4+d5+e4

|   | a | b | c | d | e | f | g |
|---|---|---|---|---|---|---|---|
| 1 |   | JUN | JUL | AUG | SEP | SUM |   |
| 2 | PARTS | 10 | 12 | 14 | 15 |   |   |
| 3 | PRICE/PART | 20 | 21 | 22 | 22 |   |   |
| 4 | PART COST | 200 | 252 | 308 | 330 | 1090 |   |
| 5 | OVERHEAD | 50 | 51 | 50 | 51 | 202 |   |
| 6 | TOTAL COST | 250 | 303 | 358 | 381 | 1292 |   |
| 7 | ITEMS SOLD | 6 | 10 | 15 | 18 |   |   |
| 8 | ITEM PRICE | 25 | 26 | 28 | 30 |   |   |
| 9 | SALES REV | 150 | 260 | 420 | 540 | 1370 |   |
| 10 | NET | (100) | (43) | 62 | 159 | 78 |   |
| 11 | CHECK |   |   |   |   | 78 |   |
| 12 | DIVIDEND |   |   |   |   | 50 |   |
| 13 | CARRY |   |   |   |   | 28 |   |
| 14 |   |   |   |   |   |   |   |

FIG. 15

VISUAL AID TO SIMPLIFY ACHIEVING CORRECT CELL INTERRELATIONS IN SPREADSHEETS

FIELD OF THE INVENTION

This invention relates to a method of displaying a spreadsheet so as to facilitate the identification of errors.

BACKGROUND OF THE INVENTION

An electronic spreadsheet is a two-dimensional grid containing data and formulas that are entered in a manner allowing computer manipulation. Spreadsheets can be used for simple applications such as balancing a checkbook, to applications as complex as inventory control and pricing for a factory. The formulas relate the data and produce results. For example, FIG. 1, column d (row n) may result from the summation of column c (row n) and column b (row n). See that the result of 41 in d3 equals the sum of the 17 in b3 and the 24 in c3. This result may in turn be used as data in other formulas. For example, FIG. 1, row 5 may be the sum of rows 2, 3, and 4. See that the 60 in b5 equals the sum of the 24 in b2, the 17 in b3, and the 19 in b4. As more data and formulas are entered into the spreadsheet, the interrelations that occur become complex and difficult to understand. Unfortunately, the accuracy of the final result depends on correctly linking together the data of the spreadsheet with all the formulas. As the spreadsheet becomes larger and more complex, it is difficult to determine whether all the relations have been correctly entered.

There are many spreadsheets out in the marketplace today for example Lotus 1-2-3 (Lotus 1-2-3 Release 5 User's Guide. Lotus Development Corporation, Copyright 1994). Generally values are entered into a spreadsheet by clicking on a particular cell. This causes its current formula (perhaps none) to be displayed in a bar 11 often at the top FIG. 1. The user can then begin to type the desired formula or data into the spreadsheet. The value of the formula is displayed in the current cell. Over time, spreadsheet developers have enhanced spreadsheets to be able to contain text from word processors, data from other programs, and even in some cases images from paint or draw programs. Also, many possibilities for displaying the results have been developed, e.g. pie charts, bar graphs. However, all these features rely on the fact that the base formulas correctly interrelate the different cells containing information.

Spreadsheet developers have taken some steps in the direction of aiding the user in getting the crucial step or correctly defining cell interrelations. It is now possible to cut and paste formulas, and the spreadsheet automatically attempts to update the formulas to fit in the new location. There are also techniques to apply a given formula over a whole range of cells, where the data in the cells are updated as appropriate for the specific rows and columns that the formula has been applied to.

Currently, debugging a spreadsheet to find an error is difficult because users can not easily or visually see how the cells interrelate. While techniques that reduce the time taken to make a spreadsheet and reduce the possibility of making an error have been implemented, there is still a great need for techniques that help a user determine if the dependencies between cells they have entered into the spreadsheet are correct. There is also the need to help users more quickly track down the reason for an error when they discover one in their spreadsheet.

SUMMARY OF THE INVENTION

It is an object of this invention to allow the users to visually determine the relationship between the different cells in the spreadsheet.

It is another object of this invention to facilitate creating a error free spreadsheet With this invention, in a spreadsheet, all cells having data that depends on or affects the data in a user selected cell are visually indicated on a display. For example, in FIG. 2, if d2 (see bold rectangle surrounding the formula in d2) is chosen, and since cell d5 depends on d2, and since d2 depends on b2 and c2, cells d5, b2, and c2 are shaded. Cells farther away are shaded with a lighter color to indicate their increased distance from the selected cell in the dependency tree. The user can control both the number of levels of dependency relations to display as well as the branching factor (See below.) for the relations. The relations for a chosen cell become visually obvious to the user, who can then determine if the correct relations have been entered into the spreadsheet. Using this invention greatly simplifies the users' task of ensuring that all the proper relations between cells have been established in the spreadsheet. This invention also simplifies finding an error if the final result(s) of the spreadsheet are not as expected.

Throughout this application, when it is said that one cell depends on another cell, it actually means that the data in the one cell is dependent on the data in the other cell. For cell B (for example) to be directly determined by cell C (for example), cell C must appear in the formula of cell B. Likewise, for cell B to directly determine cell A (for example), cell B must appear in the formula of cell A.

Also, with this invention, the formula of all the cells in a spreadsheet can be displayed to facilitate error detection.

BRIEF DESCRIPTION OF THE DRAWINGS

The invention will now be described in greater detail with specific reference to the appended drawings wherein:

FIG. 1 represents a basic spreadsheet as described by prior art.

FIG. 2 represents a basic spreadsheet with debugging highlighted enabled and cell d2 selected.

FIG. 3 represents the different menu options available to a user with this invention. It shows what the user sees in the process of selecting the number of levels to display highlighting for.

FIG. 4 represents a generic spreadsheet that is used for demonstration purposes throughout the application. This might be a overly simplistic representation of a factory balancing their books.

FIG. 5 represents the same spreadsheet as in FIG. 4 except that the option to show all formulas has been enabled.

FIG. 6 represents a spreadsheet where the user had incorrectly entered the formula in cell d10. The correct formula should be "=d9–d6" but in example the incorrect formula of "=d9–b6" has been entered.

FIG. 7 represents the spreadsheet in FIG. 6 with Debugging highlighting enabled and cell b10 selected. FIGS. 7–9 are a sequence as described in the preferred embodiment that a user would use to debug the error in FIG. 6.

FIG. 8 represents the spreadsheet in FIG. 6 with Debugging highlighting enabled and cell c10 selected.

FIG. 9 represents the spreadsheet in FIG. 6 with Debugging highlighting enabled and cell d10 selected. Note the visual difference between FIGS. 7 and 8 and FIG. 9.

FIG. 10 represents the spreadsheet with all levels of debugging enabled and cell b2 selected.

FIG. 11 represents the spreadsheet with only 2 levels of debugging enabled and cell b2 selected.

FIGS. 12–15 represents a sequence of successive clicks on cell f4 with a branching factor of 1 chosen. Notice that each of FIGS. 12–15 is different and represents a unique path from the selected cell back to a lead node.

DESCRIPTION OF PREFERRED EMBODIMENT

Figure 3:
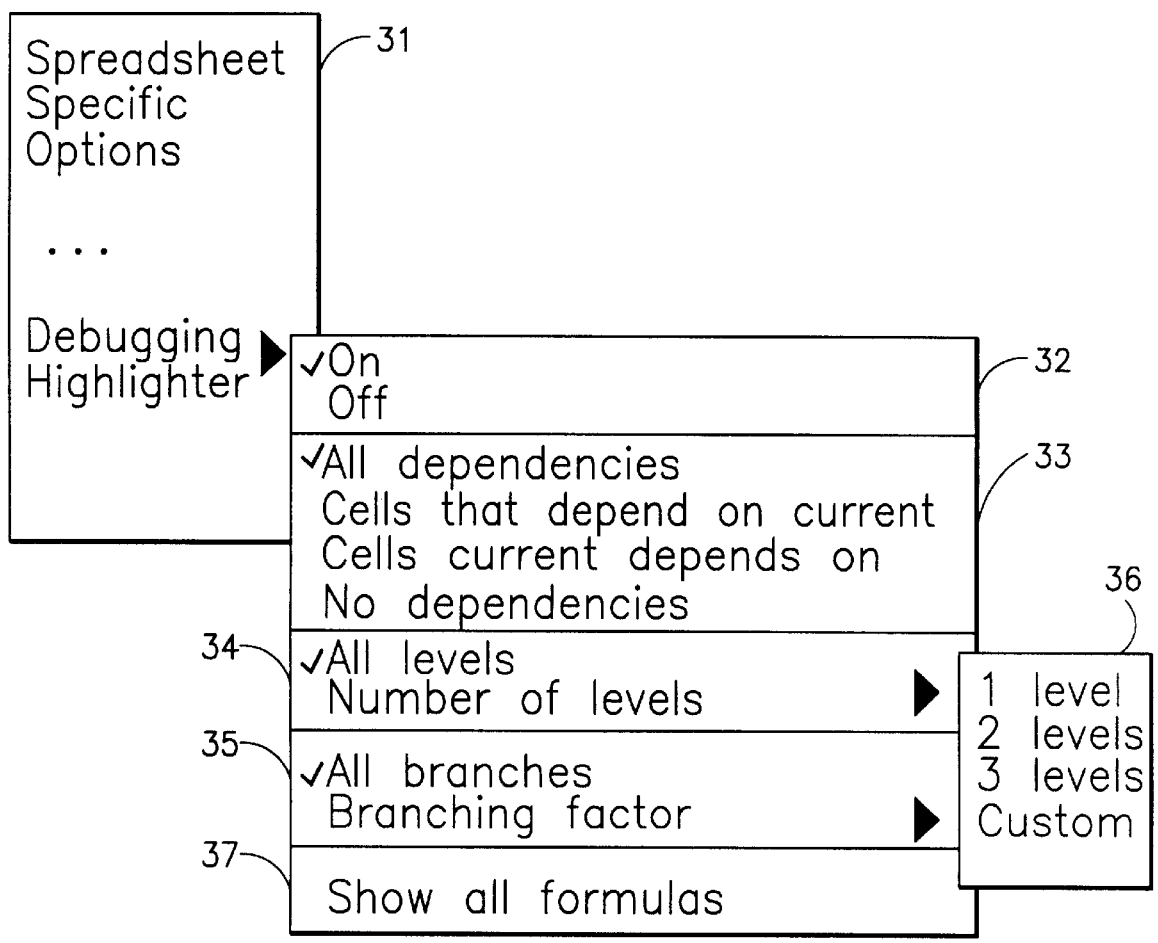

Though the invention is not limited to the following described implementation, this implementation demonstrates the potential advantages of using the inventive mechanism over other mechanisms. The preferred embodiment of this inventions is illustrated in FIGS. 2–17.

A electronic spreadsheet is a two-dimensional grid containing data and formulas that are entered in a manner allowing computer manipulation. The formulas relate the data and produce results. For example, FIG. 2 column d (row n) may result from the summation of column c (row n) and column b (row n). See that the result of 118 in d5 is the sum of 60 in b5 plus the 58 in c5. This result may in turn be used as data in other formulas. As another example, FIG. 2 row 5 may be the sum of row 2, row 3, and row 4. See that the result of 60 in b5 is the sum of the 24 in b2, the 17 in b3, and the 19 in b4. As more data and formulas are entered into the spreadsheet, the interrelations that occur become complex and difficult to understand. The accuracy of the final result(s) depends on correctly linking together the data in the spreadsheet with all the formulas. As the spreadsheet becomes larger and more complex, it becomes increasingly difficult to determine whether all the relations have been correctly entered.

As a first simple example, if cell d2 in FIG. 2 is chosen (as indicated by the dark black box surrounding it), then the cell that depends on d2 is d5, with d5 shaded to indicate such. In addition, d2 depends on b2 and c2, which are also shaded to indicate this dependency. Cells farther away are shaded with a lighter color to indicate their increased distance in the dependency tree as described in more detail below. The relations for the chosen cell become visually obvious to the user, and the user can then determine if the correct relations have been entered into the spreadsheet. Using this tool greatly simplifies the users' task of ensuring that all the proper relations between cells have been established in the spreadsheet. It also simplifies finding an error if the final results of the spreadsheet are not as expected.

Cells that are farther away from the selected cell are highlighted with lighter and lighter shading. While in this document black and white figures have been used of necessity, the actual implementation would contain color, allowing easier distinctions to be made.

The user first chooses the type of debugging highlighting they prefer by selecting it from the options on, for example, the View menu pulls down. While the View choices may be spreadsheet specific, one of those choices available for all implementations will be Debugging Highlights, which in turn leads to another menu of choices containing five different choices (32, 33, 34, 35, and 37 of FIG. 3). One choice (32) indicates whether the debugging is on or off. Another choice (33) indicates the type of dependencies displayed, including but not limited to: all dependencies, cells that depend on current, cells current depends on, and no dependencies. In the scenario where no choice is selected, a default choice, such as all dependencies is chosen. Once the user selects the desired option, the user can click on a given cell, and the relations will be highlighted. Also, as part of this menu (choices 34, 36) the user can select how many levels of relations backward and forward the spreadsheet should display. With the default setting preferably set at all Finally, the user can choose the branching factor (choice 35) of the relations to display with the default again preferably being all. The advantage of choosing different numbers of levels and different branching factors will be described in more detail below. Another option (choice 37) simultaneously shows all the formulas used to generate the values for each of the cells, rather than the actual data for the cells (See FIG. 5.). The custom option at 36 of FIG. 3 allows the user to customize the number of levels to suit his/her needs. A similar custom option (not shown) exists for branching factor.

FIGS. 4–15, depict a larger spreadsheet that will be used throughout the remaining description of the embodiment. FIG. 4 shows what the spreadsheet looks like when all the formulas and data have been entered. Many of the entries are self-explanatory, such as cell c3 of FIG. 4 which represents the price per part paid in July. For convenience, FIG. 5 shows all the formulas that have been used to generate the spreadsheet displayed in FIG. 4. Referring to FIGS. 4–15, note particularly cells f10 and f11, which calculate the same value via different routes as a way of providing a check. As is evident in FIG. 5, cell f10 calculates the net by summing all the cells in row 10, while cell f11's value is calculated by subtracting the sum of the columns in row 9 (cell f9) from the sum of column in row 6 (cell f6), hence the formula for f11 is "=f9−f6". All the rest of the FIGS. in the preferred embodiment will be based on these FIGS. (4–15), with specific reference to cells f10 and f11 which facilitate understanding of the different debugging options.

The rest of the preferred embodiment is divided into two sections. Section 1 contains a brief description of how the end user would employ this invention to track down an error in a spreadsheet or to determine if all the formulas are correct. Section 2 describes how to implement the invention within a spreadsheet.

Section 1

User Application of Graphical Spreadsheet Debugging Technique

For the current example, it is assumed that, in the spreadsheet represented in FIGS. 4 and 5, the user had entered an incorrect formula of "d9−b6" in cell d10 instead of the correct formula of "=d9−d6". This entry would result in the incorrect value of 186 (instead of 78) being displayed in cell f10. (See FIG. 6). Because the user had been careful to also enter a check cell, cell f11, it is immediately obvious that an inconsistency in the formulas is present (186 of cell f10 does not equal 78 of cell f11). However, it may be difficult to track this down. If the user enabled the debugging feature and started clicking on the net cells of b10, c10 and d10, FIGS. 7, 8, and 9 would result, such that FIG. 7 results when the user clicks on cell b9, FIG. 8 results when the user clicks on c10, and FIG. 9 results when the user clicks on d10. In viewing the spreadsheet as displayed in FIG. 9, it becomes immediately obvious what the problem is. In FIGS. 7–8, cell b10 depends on cells b2 through b9, and cell c10 depends on cells c2 through c9. In FIG. 9 it is visually obvious that some of the cells that d10 is dependent on come from the b column, instead of totally from the d column. Once detected, the user can then fix the mistake, and the spreadsheet will now appear as it is supposed to (see FIG. 4). While in the above example the formulas were not that complicated, in real spreadsheets, formulas can become complex. By using some of the more advanced features described in section 1.1 and 1.2 below, the user could just click on the final incorrect result and determine the error. The basic technique described here is a tremendous help in debugging a spreadsheet. Moreover, the content of the following two sections makes the technique more powerful by giving the user options of what and how much is being displayed.

Section 1.1: Display Levels

The text in this section refers to FIGS. 10 and 11. For example, in FIG. 10 the user selected cell b2, which is indicated by the bold dark rectangle surrounding the number 10. Cell b4 has the darkest shading because b4 immediately depends on the selected cell b2. Cells b6 and f4 have the next darkest shading, because they depend on b4 which in turn depends on b2. Thus b6 and f4 are at the second level of dependency. Thus, using the same reasoning, cells b10 and f10 are at the third dependency level, and are shaded with a third darkest level of shading. Finally, f10 and f11 are at the fourth dependency level, and are shaded with a fourth darkest level of shading. In spreadsheets that are particularly large, the final result or even some of the partial results may depend on a very long sequence of dependencies backward. Likewise, in a large spreadsheet, a particular cell may have a long chain of cells forward that depend on it. Sometimes it is useful to display all the information. In other situations, it may be more helpful to focus on the next dependency, or on the next couple of dependencies backward or forward. By allowing the number of levels of dependencies to be set, the user has explicit control over how much of this information will be displayed. For example, FIG. 10 shows a click on cell b2 with all levels chosen, and FIG. 11 displays the results if 2 levels of dependency display are chosen.

Section 1.2: Branching Factor

Figure 16:
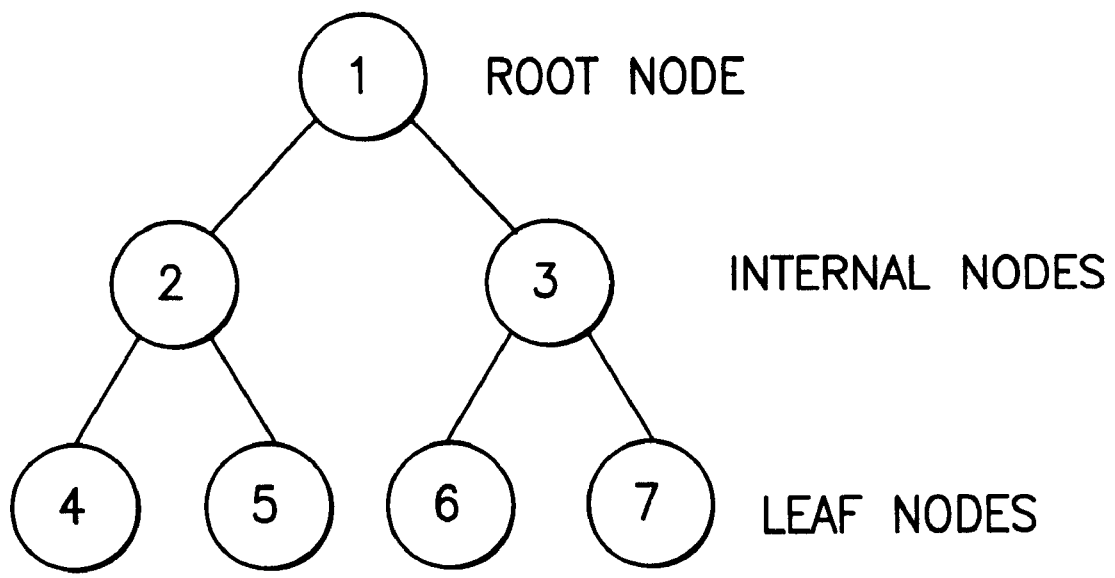
FIG. 16 represents a tree walked in breadth-first search order, with the number on the nodes indicating the traversal order.

The text in this section refers to FIGS. 12 through 15. It has been observed that even more than levels of display, the branching factor can cause an overload of information to be displayed. The branching factor is defined for a direction of the dependency from a selected cell. For example, referring to FIG. 5 one cell is dependent upon the selected cell f9 (the dark rectangle and shading indicating actual selection of the cell is not shown), and the branching factor is 1 for the "who_depends on_me" list (See below.) for cell b9. On the other hand, for example, for the other direction of dependency, the selected cell depends on four cells (b9, c9, d9, e9) and thus the branching factor is four for the "who_i_depend_on" list. In FIG. 16, for example, cells (nodes) 1, 2, and 3 have a branching factor of two because each of cells 1, 2 and 3 have two cells which depend on them. As another example, a cell having a branching factor of 4 depends on 4 cells, and each of those 4 cells could in turn depend on another 4 cells, such that, within 4 levels, there could be 256 cells that depend on the initial chosen cell.

A path is a sequence of cells from a root cell (node) to a leaf cell (node), for example, cells 1, 2, and 4 in FIG. 16. Some of the cells in the spreadsheet have a particularly high branching factor. For example, in FIG. 4, clicking on cell f10 would cause all cells from columns b to e and rows 2 to 10 to be highlighted. Setting the branching factor allows the user to control at each stage how many previous (or next) dependencies are followed. Each successive click on the selected cell changes the path through the dependency tree to show the next "n" set of paths backward or forward, where n is the branching factor chosen by the user. As a simple example, FIG. 12 shows a click on cell f4 with a branching factor of 1. Continuing with a branching factor of 1, the next successive (not double) click on cell f4 results in FIGS. 13, 14 and 15. Thus, in a sequence the user gets to see all of the dependency trees on which that cell f4 depends.

Section 2

Implementation

Spreadsheets are generally densely populated matrices. Most users configure spreadsheets with formulas and data in successive columns or rows. It is rare to leave multiple, let alone tens of, columns or rows blank internal to the spreadsheet. While the description below assumes a simple dense data structure of a two dimensional array, the implementation techniques below would still apply even when a high percentage of spreadsheets would be sparse. For the latter scenario, a data structure appropriate for holding a sparse two dimensional array, familiar to anyone skilled in the art, would be substituted for the simple one described below, with everything else remaining intact.

Figure 17:
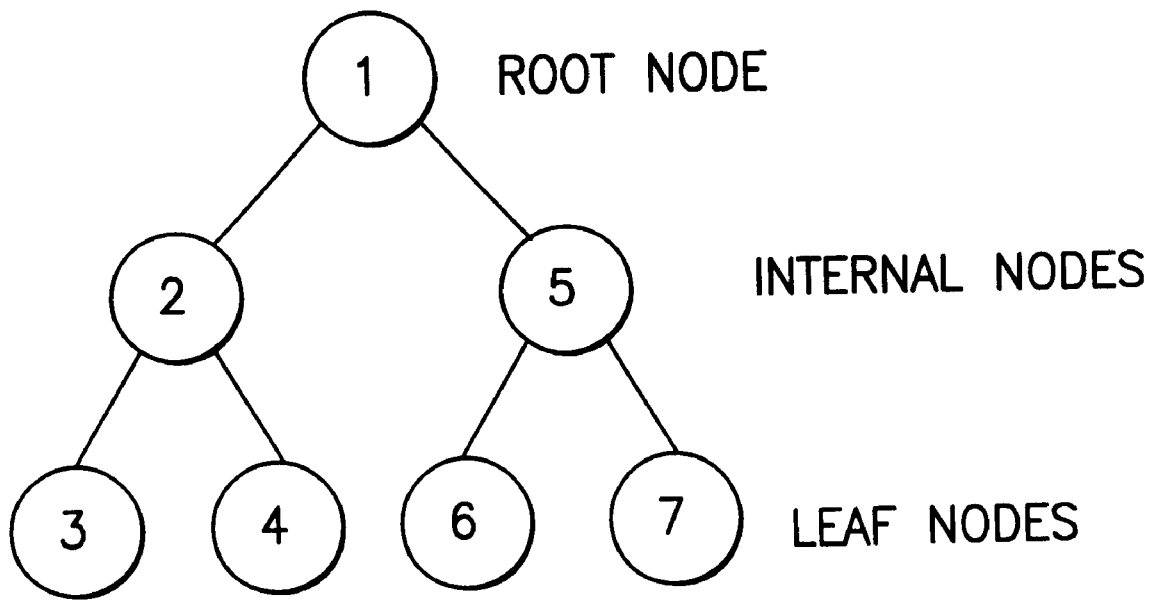
FIG. 17 represents a tree walked in depth-first search order, with the number on the nodes indicating the traversal order.

The spreadsheet is represented in a computer program as a two dimensional array of data structures. Each structure contains, among other things, a formula of the cell, a linked list (see below) of pointers to cells that depend on the cell, and a linked list (see below) of pointers to cells from which that cell depends. For the purposes of this application the focus is on the aspects of the structures relevant to this invention, such that the dependency relationship is only kept for the cells immediately dependent on the cell or cells from which this cell immediately depends. The whole sequence of cells is implicit in that each cell contains pointers to its dependencies. Conceptually, the pointers form a dependency tree. While a tree data structure can be found in any standard undergraduate data structures textbook and should be familiar to those skilled in the art, for the sake of convenience, two trees are presented in FIGS. 16 and 17. FIG. 16 represents a tree explored via a breadth-first search, and FIG. 17 represents a tree explored by a depth-first search. The root node (1) would represent the selected cell, with the internal nodes 2 and 3 representing the cells that are immediately dependent on the selected cell, hence the cells at level 1. Leaf nodes 4 and 5 represent the cells that depend on the cell that node 2 represents. Similarly leaf nodes 6 and 7 represent the cells that depend on the cell that node 3 represents. Nodes 4, 5, 6, and 7 are at dependency level 2.

Whenever a user enters a new formula, the formula is examined to determine if there are any cells mentioned in the formula. For each cell that is mentioned in the formula, an entry needs to be made to the linked list of "who_i_depend_on". For example, in FIG. 5 for cell f6, the "who_i_depend_on" list would contain the following cell entries: b6, c6, d6, and e6. For this example, the entries are at level 1, so that the cell entries would be depicted with the darkest shading. Also, the program must traverse the set of cells from which the newly entered cell depends and update the (who_depends_on_me) list for each cell in the set to indicate the newly entered cell. For example, in FIG. 5 in the newly entered cell f6, the "who_depends_on_me" list would contain cell f11. A similar updating process needs to occur when a formula from a particular cell is deleted. The program must tell all of the cells appearing in the formula to remove the particular cell from their "who_depends_on_me" list. A combination of the above processes needs to occur when a formula is modified. For all of the newly added dependencies, a process as described above for a newly added cell needs to be followed; and for all of the dependencies deleted from the formula, a process as described above for deleted cells needs to be followed.

When dependency debugging is enabled by selecting 32 in FIG. 3, all the information is already available for a program to be able to display the dependencies. In the standard case (when all branching and all levels are being displayed), the program simply sets a count and walks, via a breadth-first search, through the trees of dependencies. The program displays each dependency via highlighting, first highlighting (in appropriate color or shading style) all of the cells that a selected cell depends on, to depict the first level of highlighted cells. The program then goes to all of the first level of highlighted cells and highlights all of the cells that the first level of highlighted cells depend on, to show a second level of highlighted cells, and so forth. For example, the first highlighted level in FIG. 10 would contain cell b4; the second highlighted level would contain cells b6 and f4; the third highlighted level would contain cells b10 and f6; and, finally, cells f10 and f11 would be in the fourth highlighted level. This tracing of dependency chains is carried out in both directions for cells that the selected cell depends on, as well as cells that are dependent on the selected cell. This information is obtained by using the "who_depends_on_me" and "who_i_depend_on," lists contained in the data structure for the selected cell. A level variable is incremented every time the program moves on to the next level of cells, and the darkness of the highlighting is dependent on the current level number that the program is highlighting. Therefore, the highlighting becomes lighter the farther away one moves from the selected cell in the dependency chain.

Implementing either the "cells that depend on current" (the "who_i_depend_on" list) or "cells current depends on," (the "who_depends_on_me" list) choices from FIG. 3 is trivial; one list or the other is used when starting the highlighting. Likewise, implementing the display level feature is also not difficult. A count is kept as to the number of levels traversed, and the highlighting is stopped once the numbers of levels reached matches the user chosen value. Implementing the branching factor, however, is slightly more complicated. Rather than utilizing the default breadth first search and highlight algorithm described above, conducting a depth first search is required for implementing the branching factor. All searches must reach a leaf node (unless terminated earlier based on the user setting the number of levels to be highlighted). Upon successive clicks of the selected cell, a new leaf (or leaves for branching factors greater that 1) must be determined by continuing along the depth first search. The old leaf (or leaves) and any internal nodes that are no longer active in the new path must be un-highlighted and new ones must be highlighted. This is accomplished by un-highlighting a leaf/node when leaving a node in the search and highlighting the node (possibly again) when encountering the node.

If the branching factor is greater than 1, then additional information needs to be maintained about how many current paths have been searched and displayed for each successive user click on a given cell. For example, with a branching factor of three, it is necessary to remember the three leaves that are currently highlighted, so that when the depth first search continues, those three leaves may be un-highlighted.

Having thus described the invention, what we claim as new and desire to secure by Letters Patents is:

1. In a computer system having a display device, a method of detecting and displaying on said display device dependencies of cells in a spreadsheet having a plurality of cells, said method comprising:
   receiving user input of a selected cell, and the dependencies, dependency levels, and branching factors for display;
   automatically detecting dependencies among cells; and
   automatically generating a display of the dynamically detected dependencies among cells by the steps of:
      visually marking a first group of said cells with at least one first marking, wherein each cell of said first group has data therein which is used to determine data that is in a selected cell; and
      simultaneously visually marking at least one second group of said cells with at least one second marking, wherein each of said at least one second marking is visually distinguishable from each of said at least one first marking, and wherein each cell of said second group has data therein which is determined by said data in said selected cell and wherein said at least one second marking comprises a plurality of second markings which are visually distinguishable from each other and which represent at least one of different dependency levels and branchings from said selected cells.

2. A method as recited in claim 1, wherein each group of cells is divided into a hierarchy of levels, wherein data in each cell in each level of said hierarchy is used to directly determine, or is directly determined by, data in a cell of a next higher level of said hierarchy, and wherein each cell in each level is visually marked to indicate that it belongs to said level.

3. A method as recited in claim 1, wherein each group comprises at least one path from said selected cell to a leaf cell in said each group, wherein each leaf cell is a cell in each said path which is furthest away from said selected cell.

4. A method as recited in claim 3, wherein a number of paths displayed is selectable by a user of said system.

5. A program storage device readable by a machine, tangibly embodying a program of instructions executable by said machine to perform method steps for detecting and displaying on a display device dependencies of cells in a spreadsheet having a plurality of cells, said method steps comprising:
   receiving user input of a selected cell, and the dependencies, dependency levels, and branching factors for display;
   automatically detecting dependencies among cells; and
   automatically generating a display of the dynamically detected dependencies among cells by the steps of:
      visually marking a first group of said cells with at least one first marking, wherein each cell of said first group has data therein which is used to determine data that is in a selected cell; and
      simultaneously visually marking at least one second group of said cells with at least one second marking, wherein each of said at least one second marking is visually distinguishable from each of said at least one first marking, and wherein each cell of said second group has data therein which is determined by said data in said selected cell and wherein said at least one second marking comprises a plurality of second markings which are visually distinguishable from each other and which represent at least one of different dependency levels and branchings from said selected cells.

6. In a computer system having a display device, a method of detecting and displaying on said display device dependencies of cells in a spreadsheet having a plurality of cells, said method comprising:
   receiving user input of a selected cell, and the dependencies, dependency levels, and branching factors for display;
   automatically detecting dependencies among cells; and automatically generating a display of the dynamically detected dependencies among cells by the steps of:
  visually marking a first group of said cells with at least one first marking, wherein each cell of said first group has data therein which is used to determine data that is in a selected cell; and
  simultaneously visually marking at least one second group of said cells with at least one second marking, wherein each of said at least one second marking is visually distinguishable from each of said at least one first marking, and wherein each cell of said second group has data therein which is determined by said data in said selected cell and wherein said at least one second marking comprises a plurality of second markings which are visually distinguishable from each other and which represent at least one of different dependency levels and branchings from said selected cells.

7. A method as recited in claim 6, wherein each group of cells is divided into a hierarchy of levels, wherein data in each cell in each level of said hierarchy is used to directly determine, or is directly determined by, data in a cell of a next higher level of said hierarchy, and wherein each cell in each level is visually marked to indicate that it belongs to said level.

8. A method as recited in claim 6, wherein each group comprises at least one path from said selected cell to a leaf cell in said each group, wherein each leaf cell is a cell in each said path which is furthest away from said selected cell.

9. A method as recited in claim 6, wherein a number of paths displayed is selectable by a user of said system.

10. A program storage device readable by a machine, tangibly embodying a program of instructions executable by said machine to perform method steps for detecting and displaying on a display device dependencies of cells in a spreadsheet having a plurality of cells, said method steps comprising:
  receiving user input of a selected cell, and the dependencies, dependency levels, and branching factors for display;
  automatically detecting dependencies among cells; and
  automatically generating a display of the dynamically detected dependencies among cells by the steps of:
    visually marking a first group of said cells with at least one first marking, wherein each cell of said first group has data therein which is used to determine data that is in a selected cell; and
    simultaneously visually marking at least one second group of said cells with at least one second marking, wherein each of said at least one second marking is visually distinguishable from each of said at least one first marking, and wherein each cell of said second group has data therein which is determined by said data in said selected cell and wherein said at least one second marking comprises a plurality of second markings which are visually distinguishable from each other and which represent at least one of different dependency levels and branchings from said selected cells.

* * * * *